Jan. 12, 1937.  J. W. WALLIS  2,067,428
PIPE COUPLING
Filed Sept. 30, 1935
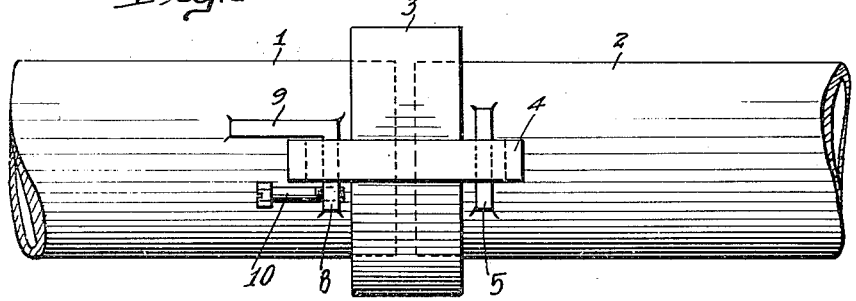
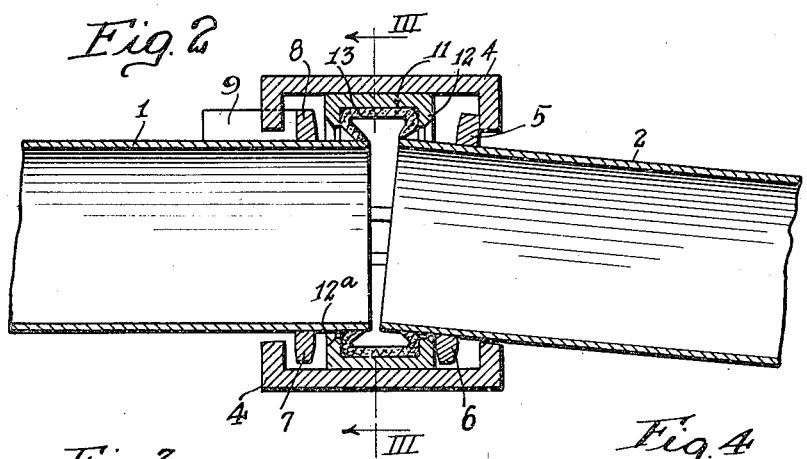
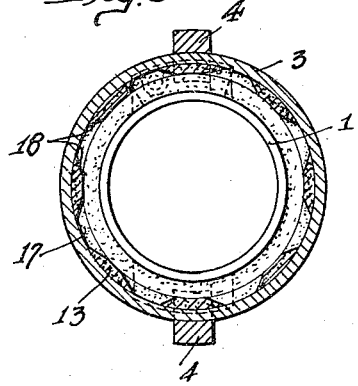
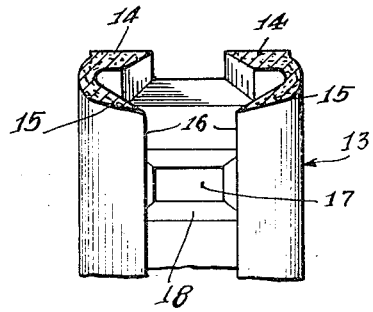
INVENTOR.
John W. Wallis
BY Lyon & Lyon
ATTORNEYS Patented Jan. 12, 1937

2,067,428

UNITED STATES PATENT OFFICE 2,067,428

PIPE COUPLING

John W. Wallis, Los Angeles, Calif.

Application September 30, 1935, Serial No. 42,843

12 Claims. (Cl. 285—193)

This invention relates to couplings for pipes carrying liquids, semi-liquids, or gases, under pressure and more particularly to coupling structures for temporary pipe lines in which it is important to be able to easily and quickly make and break connections between sections of the pipe.

The invention has special application in modern irrigation systems of the type in which water is conducted from a pump or other source of pressure supply through portable or temporary pipe lines laid on the surface of the ground to furrows or sprinkler heads which distribute the water over the adjacent area. In such systems the pipe line is moved at intervals to irrigate new areas and the commercial practicability of the system depends in large measure on the time and labor required to disassemble the pipe lines, move the pipe sections to the new location and reassemble them into a fluid-tight line. It is also very desirable, and quite necessary when operating on uneven ground, that some bending of the pipe line at the joints be permissible to allow the line to follow the contour of the ground and also to permit lateral bending of the line without resorting to special angle couplings.

A broad object of the invention is to provide a pipe coupling that is pressure tight and yet may be connected or disconnected quickly and easily without the use of special tools.

A more specific object is to provide a pressure tight quick coupling construction, permitting one pipe to be connected to another by manipulation of the pipe alone without making manual adjustments on the coupling proper, whereby one man while standing erect can support one pipe section at the middle thereof while connecting the end to another pipe section lying on the ground.

Another object is to provide a pressure tight, quickly attachable or detachable pipe coupling having a substantial degree of flexibility.

Another object is to provide a pressure tight, quickly attachable or detachable coupling construction which is simple, inexpensive to manufacture and rugged and durable in use.

Another object is to provide a pressure tight quickly attachable or detachable pipe coupling structure that is only slightly larger in overall diameter than the pipe itself and is sufficiently rigid to prevent it from becoming battered by careless handling, and whereby the couplings when mounted on the ends of pipe sections interfere to a minimum extent with stacking of the pipe.

Another object is to provide a pressure tight quickly attachable or detachable coupling that may be coupled or uncoupled regardless of where situated along the pipe line, without the necessity of first disconnecting all the sections from one end of the line up to the point where it is desired to open the line.

Another object is to provide a pressure tight, quickly attachable or detachable coupling that becomes water-tight only in response to a predetermined water pressure therewithin so that when the water pressure is cut off from the pipe line prior to disassembling the latter, the line empties itself through the couplings, thereby avoiding the objectionable feature of having the water in the line gush out at the point where the line is uncoupled.

The manner in which the foregoing objects are achieved is explained in the following detailed description which refers to the drawing.

In the drawing:

Fig. 1 is a side elevation view of a pair of pipes interconnected in accordance with the invention;

Fig. 2 is a longitudinal sectional view through a pair of pipes coupled together in accordance with the invention;

Fig. 3 is a cross section taken in the plane III—III of Fig. 2; and

Fig. 4 is a detailed view of a portion of the gasket employed in my coupling.

Referring to Figs. 1 and 2, I have shown two smooth end pipes 1 and 2, respectively, having their ends approximately in abutting relation and interconnected by a coupling in accordance with my invention. This coupling comprises a ring 3 of internal diameter slightly larger than the external diameter of the pipes 1 and 2 and of substantial thickness to give it mechanical strength. Longitudinally the ring 3 is dimensioned to overlap the ends of the pipes 1 and 2 even when the ends of the pipes are slightly spaced from each other so that the ring at all times functions to maintain the two pipe ends in approximate abutting relation with each other.

To prevent the ends of the pipes 1 and 2 from pulling out of the ring 3, the latter is provided with a plurality of cross bars 4 which are rigidly secured to the ring 3 and have their outer ends turned inwardly to engage against the outer surfaces of lugs 5, 6, 7 and 8, respectively, on the pipes 1 and 2. The lugs 5, 6 and 7 are crescent shaped and may be of iron, bronze, brass, or steel, welded to the pipes 1 and 2. They extend circumferentially about the pipe and merge into the surface of the pipe at each end, whereby the pipe 2 bearing lugs 5 and 6 may be placed in locking engagement with the cross bars 4 by inserting the end of the pipe in the ring 3 and then rotating the pipe in either direction until the lugs 5 and 6 are positioned back of the ends of the bars 4.

It is desirable in practice to secure the ring 3 to one end of each pipe section more or less permanently. To this end, the lug 8 on one end of each pipe section is L-shaped, as shown in Fig. 1, having a leg 9 extending rearwardly from one end of the transverse portion of the lug, thereby preventing escape of the cross bar 4 from that end of the lug. To normally retain the cross bar 4 against movement away from the lug 8 in the opposite direction, a bolt 10 is provided, this bolt being threaded into the lug 8 adjacent the end of the latter opposite the extension 9.

The rings 3 may be cast, spun, pressed, or forged, and are sufficiently heavy to prevent deformation even under severe conditons of service. The bars 4 may be cast or forged integral with the ring 3 or they may be welded or riveted thereto.

I prefer to employ two lugs 5 and 6 on one end of each pipe section and two lugs 7 and 8 on the other end of each pipe section. However, it is not essential that two lugs be provided on each pipe although this seems to be the optimum number since it applies the restraining force to the pipes symmetrically and yet locks them positively against escape from the ring 3. However, for some purposes it may be sufficient to employ only one lug on the end of each pipe and one bar 4 on each ring 3. On the other hand, for other purposes it may be found desirable to use three or more lugs on each pipe and a corresponding number of bars 4 on the coupling ring 3.

The use of two oppositely disposed lugs reduces to a minimum the width and diameter of the ring 3 to permit a given flexure at the coupling. This result follows because the pipe tends to pivot about a center point lying midway between the lugs and the axis of the pipe.

To allow a limited amount of bending at each joint, the cross bars 4 are made of such length that the distance between the inner surface of their in-turned ends and the edge of the ring 3 is substantially greater than the thickness of the lugs 5, 6, 7 and 8, thereby permitting each pipe to be inclined at an angle to the axis of the ring 3. In Fig. 2 the pipe 2 is shown so positioned. I have also found it desirable in connection with this feature to shape the inner and outer surfaces of the lugs 5, 6, 7 and 8 in the general outline of a gear tooth to better adapt them for angular movement of the pipes 1 and 2 with respect to the cross bars 4.

The structure heretofore described relates only to the elements for mechanically maintaining the ends of two pipes in approximate abutting relation. I will now describe the structure for effecting a pressure tight seal between the ends of the pipes.

As shown clearly in Fig. 2, the inner surface of the ring 3 is recessed to provide a channel 11 bounded on the edges by flanges 12, the latter constituting the pipe contacting edges of the ring. Within the channel 11 I position an annular gasket 13 of resilient material, such as rubber.

As shown in Fig. 4, the gasket comprises a base portion 14 adapted to seat within the channel 11 in the ring, having rising from opposite edges thereof reentrant side walls 15 which terminate in thin edges 16, the latter projecting inwardly from the flange 12 sufficiently far to frictionally engage the ends of the pipes 1 and 2. When fluid under pressure is admitted to the pipe line, the pressure is applied directly to the interior of the gasket 13, pressing the outer portions of the side walls 15, and particularly the edge portion 16, firmly against the outer surfaces of the pipes and preventing all leakage therepast.

The side walls 15 of the gasket 13 are so shaped that they begin to bend back over the base portion 14 before they immerge inwardly beyond the edges of the flanges 12, thereby preventing the end of a pipe from catching on the gasket and distorting it as the pipe is inserted into the ring 3. By virtue of its flexible nature, the gasket conforms to the pipe regardless of the exact angle of the pipe with respect to the ring 3, the deformation of the side walls 15, and their thin edges 16, to accommodate different positions of the pipe being shown in Fig. 2.

Although the base portion 14 of the gasket 13 may be made solid, I prefer to provide openings 17 therein, the gasket material being beveled down to a thin edge all around each opening as shown at 18 in Fig. 3. The purpose of these openings 17 is to permit leakage of water from the pipe line when the pressure is less than a predetermined value. This leakage results by virtue of the fact that the rings 3, as ordinarily manufactured by casting or forging, have a rough inner surface against which the gasket 13 does not seal perfectly except when it is pressed thereagainst by fluid pressure from within. Hence if the pressure is lower than a predetermined limit, water can flow freely through the windows 17 around between the outer surface of the gasket 13 and the inner surface of the ring 3 to the exterior of the line. This permits rapid draining of the pipe line at each coupling when the water pressure is cut off preparatory to disassembling the line. However, when the water pressure is increased past a predetermined point, depending upon the construction of the gasket 13, the latter is pressed firmly against the inner surface of the ring 3 and is deformed by the pressure to follow the irregular surface of the ring and prevent any further leakage through the windows 17. Unless the ends of the pipes 1 and 2 are finished smooth, there will also be leakage between the pipes and the edges 16 of the gaskets, at low pressures.

The internal pressure required to effect a seal between the gasket and the pipes and between the gasket and the ring depends upon the roughness of the pipe and ring, and the stiffness of the gasket. Thus, it is harder to distort a relatively stiff gasket to conform to the surfaces of the ring and pipes than to distort a soft gasket. By making the gasket of relatively soft rubber, a 660 foot pipe line has been constructed which became water tight at the coupling under a water head of 8 feet but which leaked at the coupling and promptly emptied the line when the source of supply was cut off and the water head was reduced to 4 feet.

The leakage between the gasket and ring may also be reduced by reducing the area of the openings 17 and/or their number. Thus, by making the openings small and few in number and making the gasket of very soft rubber, a perfect seal can be effected under a pressure equivalent to a water head of only 1 foot.

As previously mentioned in the statement of the objects of the invention, the structure described has no adjustable or manipulatable parts to get out of order or to require manual adjustment at the coupling. This eliminates any necessity for the operator going to the coupling either to couple or uncouple it. By virtue of this fact, plus the fact that the two pipes to be coupled need not be in alignment, an operator may readily connect one section of pipe to another section of pipe lying on the ground by supporting the first pipe at or near the center of gravity of the section, and while the operator is in a standing position, thereby reducing the heavy labor incident to supporting a heavy weight while performing a turning or adjusting operation in a stooped position.

To aid in entering the ends of the pipes into the rings 3, the flanges 12 are preferably provided with conical faces 12a on their outer edges, these conical faces serving to guide the ends of the pipes into the rings.

By virtue of the fact that the lugs 5 and 6 on one end of each pipe section extend circumferentially instead of helically, they may be released from the bars 4 by rotating the pipe in either direction, and the pipe line can be opened at any coupling without uncoupling the remainder of the couplings.

The coupling's lack of lateral projections enables it to remain on the pipe section while it is being stacked for transportation or storage, thereby effecting a saving in the time of handling and in assembling at the location.

As previously mentioned, its design is such that it may be cast or forged from the more durable materials, such as malleable iron, malleable cast iron, or cast steel, thereby making the coupling almost indestructible. Because of its strength, the line may cross ditches or gulches without necessity of supporting the coupling to prevent its rupture.

By virtue of the flexibility of the couplings, the pipe line may be laid on very irregular surfaces and/or along an irregular route without employing a special angle pipe fitting. Furthermore, by virtue of this flexibility, the pipe line may be moved while under high internal pressure, much as one can move a hose while under pressure.

Although the invention has been described in detail with reference to a particular construction that may be employed, it is understood that various modifications may be made in the structure described without departing from the invention and the latter is to be limited only as set forth in the appended claims.

I claim:

1. A pipe coupling comprising the combination of two pipes to be coupled with a ring dimensioned to fit loosely about and overlap the end of one at least of the pipes when the latter are in approximate abutting relation, means for securing the ring to the other of said pipes, resilient means within said ring for sealing about the end of said one pipe, and means for securing said one pipe against separating movement while permitting angular movement of it relative to the ring, comprising a lug on said one pipe spaced from the end thereof, and a bar member immovably anchored to said ring crosswise thereto and having an inwardly projecting end portion for engaging the rear face of said lug, the lug extending only part way about the pipe whereby the pipe may be locked to the ring by inserting the pipe end into the ring with the lug thereon out of alignment with the bar member, and then rotating the pipe with respect to the ring to move the lug into alignment with the bar member and back of the inwardly projecting end portion of said bar member, said ring having an opening therein of greater diameter than said pipe for a distance extending inwardly from the lug-contacting face of said bar member substantially greater than the distance from the bar-contacting face of the lug to the end of the pipe.

2. A pipe coupling comprising the combination with two pipes to be coupled of a ring dimensioned to fit loosely about and overlap the end of at least one of said pipes, means for securing said ring to the other of said pipes, resilient means within said ring for sealing about the end of said one pipe, and means for securing said one pipe against separating movement with respect to said ring while permitting angular movement of the one pipe relative to the ring, comprising a lug on said one pipe spaced from the end thereof, and a bar member anchored to said ring crosswise thereto and having an inwardly projecting end portion for engaging the rear face of said lug, and stop means on said one pipe for contacting the side of said bar member and preventing circumferential movement of the bar member out of engagement with the lug on the pipe.

3. A pipe coupling comprising the combination with two pipes to be coupled of a ring dimensioned to fit loosely about and overlap the end of one at least of said pipes, means for securing said ring to the other of said pipes, resilient means within said ring for sealing about said one pipe, and means for securing said one pipe against separating movement with respect to said ring while permitting angular movement of the pipe relative to the ring, comprising a lug on said pipe spaced from the end thereof, and a bar member immovably anchored to said ring crosswise thereto and having an inwardly projecting end portion for engaging the rear face of said lug, and said lug having a rearwardly extending shoulder on one end thereof and detachable stop means on the other end of the lug for preventing circumferential movement of the bar member out of engagement with the lug.

4. A pipe coupling comprising the combination with two pipes to be coupled of a ring dimensioned to fit loosely about and overlap the end of at least one of the pipes, means for securing the ring to the other pipe, resilient means within said ring for sealing about the end of said one pipe, and means for securing said one pipe against separating movement with respect to said ring comprising a plurality of lugs on said one pipe spaced from the end of the pipe and spaced circumferentially about the pipe, a plurality of bar members immovably anchored to said ring crosswise thereto and spaced circumferentially thereabout, each bar member extending longitudinally from said ring over said one pipe when the latter is inserted in the ring and each bar member having an inwardly projecting end for engaging a juxtaposed lug on said one pipe, the extremities of said inwardly projecting ends of the bar members being spaced radially from the axis of said ring a distance substantially greater than the external radius of the said one pipe whereby the latter may be angularly positioned with respect to the axis of said ring.

5. A pipe coupling comprising the combination with two pipes to be coupled of a ring dimensioned to fit loosely about and overlap the end of one of said pipes, means for securing the ring to the other of said pipes, resilient means within said ring for sealing about the end of said one pipe, and means for limiting longitudinal movement of said one pipe with respect to said ring comprising a lug on that pipe spaced from the end thereof and adapted to contact the edge of said ring to limit the movement of the pipe into the ring, and means for securing said one pipe against separating movement comprising a bar member immovably anchored to said ring having an end portion extending parallel to the axis of said ring out over the said one pipe, the extreme end of said bar member extending inwardly toward the axis of the pipe for engaging the rear face of said lug, the width of the lug measured longitudinally of the pipe being substantially less than the distance between the edge of the ring and the lug-contacting face of the bar member cooperating therewith, thereby providing limited free longitudinal motion of the lug and pipe with respect to the ring and permitting free angular motion between the pipe and the ring.

6. A coupling as described in claim 5, in which the front and rear faces of said lug are curved to approach each other at the outer edge of the lug.

7. A pipe coupling comprising the combination with two pipes to be coupled of a ring dimensioned to fit loosely about and overlap the ends of the pipes when the latter are in approximate abutting relation, resilient means within said ring for sealing about the pipe ends, and means for securing said pipes against separating movement comprising a plurality of lugs on each pipe spaced from the end of the pipe and spaced circumferentially about the pipe, and a plurality of bar members anchored to said ring crosswise thereon and spaced circumferentially thereabout, each bar member having inwardly projecting ends for engaging the outer faces of a pair of juxtaposed lugs on said respective pipes and the width of the lugs being substantially less than the distance between the edge of the ring and the lug contacting faces of said bar members, thereby providing limited free longitudinal motion of the lugs with respect to the ring and limited free angular motion between the pipes and ring, said ring having a clear opening therein of greater diameter than said pipe for a distance extending inwardly from the lug-contacting faces of said bar members substantially greater than the distance from the bar-contacting faces of the lugs to the end of the pipe.

8. In combination, a pipe, a rigid annular coupling member of larger internal diameter than the external diameter of said pipe adapted to be positioned in overlapping relation with the end of said pipe, a resilient annular gasket positioned between the pipe and member, said gasket having a wall portion contacting the inner surface of said member and having continuous with one edge of said member-contacting wall portion a second reentrant wall portion adapted to contact the outer surface of said pipe, said member-contacting wall portion of the gasket having openings therethrough and the normal contours of the contacting surfaces of said member and gasket being dissimilar, whereby fluid within said pipe can escape through said openings and between the gasket and member when the pressure within the pipe is low, said resilient gasket being distorted by high pressures therewithin to seal against said member and against said pipe and prevent escape of fluid therepast.

9. A pipe coupling comprising a pipe and a member to be coupled thereto including a ring dimensioned to fit loosely about and enclose an end of the pipe, means for supporting said pipe relative to said ring, and means for effecting a seal between said pipe and ring comprising an annular gasket of resilient material positioned within said ring in overlapping relation to the end of said pipe, said gasket having thin inturned annular edges adapted to lie against the outer surface of said pipe whereby fluid pressure existent in the pipe is applied to the interior of the gasket and presses said edges firmly against the outer surface of the pipe, that portion of said gasket lying against said ring having a passage therethrough communicating with the inner surface of said ring.

10. A pipe coupling comprising a pipe and a member to be coupled thereto including a ring dimensioned to fit loosely about and enclose an end of the pipe, means for supporting said pipe relative to said ring, and means for effecting a seal between said pipe and ring comprising an annular gasket of resilient material positioned within said ring in overlapping relation to the end of said pipe, said gasket having thin inturned annular edges adapted to lie against the outer surface of said pipe whereby fluid pressure existent in the pipe is applied to the interior of the gasket and presses said edges firmly against the outer surface of the pipe, that portion of said gasket lying against said ring having a passage therethrough communicating with the inner surface of said ring and the edge of said gasket defining said opening being beveled to provide a thin edge lying against the inner surface of said ring.

11. A pipe coupling comprising the combination with two pipes to be coupled of a ring dimensioned to fit loosely about and enclose the ends of the pipes when the latter are in approximate abutting relation, means for limiting longitudinal and angular movement of said pipes with respect to said ring, and means for effecting a seal between said pipes, comprising an annular gasket of resilient material positioned within said ring in overlapping relation to the ends of said pipes, said gasket having thin inturned annular edges adapted to lie against the outer surfaces of the respective pipes whereby fluid pressure existent in the pipes is applied to the interior of the gasket and presses said edges firmly against the outer surfaces of the pipes, in which that portion of said gasket lying against said ring has a passage therethrough communicating with the inner surface of said ring.

12. A pipe coupling comprising the combination with two pipes to be coupled of a ring dimensioned to fit loosely about and enclose the ends of the pipes when the latter are in approximate abutting relation, means for limiting longitudinal and angular movement of said pipes with respect to said ring, and means for effecting a seal between said pipes, comprising an annular gasket of resilient material positioned within said ring in overlapping relation to the ends of said pipes, said gasket having thin inturned annular edges adapted to lie against the outer surfaces of the respective pipes whereby fluid pressure existent in the pipes is applied to the interior of the gasket and presses said edges firmly against the outer surfaces of the pipes, that portion of said gasket lying against said ring having a passage therethrough communicating with the inner surface of said ring and the edge of said gasket defining said opening being beveled to provide a thin edge lying against the inner surface of said ring.

JOHN W. WALLIS.